(12) United States Patent
Hu et al.

(10) Patent No.: US 9,124,113 B2
(45) Date of Patent: Sep. 1, 2015

(54) INDUCTIVELY COUPLED POWER RECEIVER AND METHOD OF OPERATION

(75) Inventors: Patrick Aiguo Hu, Auckland (NZ); Ping Si, Auckland (NZ); Kunal Bhargava, Auckland (NZ); Fady Mishriki, Auckland (NZ)

(73) Assignee: PowerbyProxi Limited, Freemans Bay, Auckland (NZ)

( * ) Notice: Subject to any disclaimer, the term of this patent is extended or adjusted under 35 U.S.C. 154(b) by 439 days.

(21) Appl. No.: 12/991,054

(22) PCT Filed: Jul. 7, 2009

(86) PCT No.: PCT/NZ2009/000137
§ 371 (c)(1),
(2), (4) Date: Nov. 4, 2010

(87) PCT Pub. No.: WO2010/005324
PCT Pub. Date: Jan. 14, 2010

(65) Prior Publication Data
US 2011/0090723 A1      Apr. 21, 2011

(30) Foreign Application Priority Data
Jul. 7, 2008   (NZ) .......................................... 569615

(51) Int. Cl.
*H02M 7/5383*    (2007.01)
*H02J 5/00*      (2006.01)
*H02M 7/217*     (2006.01)

(52) U.S. Cl.
CPC ..................................... *H02J 5/005* (2013.01)

(58) Field of Classification Search
USPC ............... 323/220, 223, 226, 232; 363/21.02, 363/21.04, 47, 74, 97, 110, 127
See application file for complete search history.

(56) References Cited

U.S. PATENT DOCUMENTS

| 4,654,573 | A | * | 3/1987 | Rough et al. ................... 320/108 |
| 5,045,770 | A |   | 9/1991 | Brooks |
| 5,293,308 | A | * | 3/1994 | Boys et al. ....................... 363/37 |
| 5,311,198 | A |   | 5/1994 | Sutton |
| 5,450,305 | A | * | 9/1995 | Boys et al. ....................... 363/24 |
| 5,596,567 | A |   | 1/1997 | deMuro et al. |

(Continued)

FOREIGN PATENT DOCUMENTS

| JP | 2000-242756 | 9/2000 |
| JP | 2001-5938   | 1/2001 |

(Continued)

*Primary Examiner* — Adolf Berhane
*Assistant Examiner* — Nusrat Quddus
(74) *Attorney, Agent, or Firm* — Merchant & Gould P.C.

(57) ABSTRACT

A contactless power receiver is provided with a dynamically tuned pick up coil. The power transfer capacity of this power receiver is dynamically tuned using semiconductor devices that are operated in linear mode over part of their operation. The semiconductor devices are driven by a controller that is configured to implement a range of control strategies depending on system requirements. The semiconductor device may be used by itself or in conjunction with reactive elements to dynamically tune the pick up coil. In some implementations the contactless power receiver maybe configured to work with a consumer electronic or a wireless sensor device. The contactless power receiver can be integrated with the energy storage component of the device to provide a retrofit solution for existing products. The device can then be placed in vicinity of a planar magnetic field generated by a charging pad.

20 Claims, 4 Drawing Sheets

(56) References Cited

U.S. PATENT DOCUMENTS

| | | | |
|---|---|---|---|
| 6,028,413 | A * | 2/2000 | Brockmann ................. 320/108 |
| 6,330,175 | B2 * | 12/2001 | Shirato et al. ................. 363/89 |
| 6,445,936 | B1 * | 9/2002 | Cannon et al. ................ 455/573 |
| 7,042,196 | B2 | 5/2006 | Ka-Lai et al. |
| 7,248,017 | B2 | 7/2007 | Cheng et al. |
| 7,382,636 | B2 | 6/2008 | Baarman et al. |
| 2002/0057584 | A1 * | 5/2002 | Brockmann ................. 363/98 |
| 2003/0193819 | A1 | 10/2003 | Iwagami et al. |
| 2005/0135122 | A1 * | 6/2005 | Cheng et al. ................. 363/24 |
| 2007/0109708 | A1 | 5/2007 | Hussman et al. |
| 2008/0179983 | A1 | 7/2008 | Hasegawa et al. |
| 2008/0203995 | A1 * | 8/2008 | Carrier et al. ................ 323/351 |
| 2009/0001932 | A1 * | 1/2009 | Kamijo et al. ................ 320/108 |
| 2009/0015210 | A1 * | 1/2009 | Kojima ........................ 320/163 |
| 2009/0058361 | A1 | 3/2009 | John |
| 2009/0284369 | A1 * | 11/2009 | Toncich et al. ............ 340/539.3 |
| 2010/0084918 | A1 * | 4/2010 | Fells et al. ..................... 307/32 |
| 2010/0171367 | A1 * | 7/2010 | Kitamura et al. ............. 307/104 |
| 2010/0181962 | A1 | 7/2010 | Chen et al. |
| 2010/0187913 | A1 * | 7/2010 | Smith et al. .................. 307/104 |
| 2010/0259215 | A1 | 10/2010 | Sip |
| 2014/0232330 | A1 | 8/2014 | Robertson et al. |
| 2014/0306545 | A1 * | 10/2014 | Robertson et al. ........... 307/104 |

FOREIGN PATENT DOCUMENTS

| | | |
|---|---|---|
| JP | 2002-010535 | 1/2002 |
| JP | 2005-525705 | 8/2005 |
| NZ | 274939 | 6/1997 |
| NZ | 526115 | 10/2006 |
| WO | WO 03/096512 | 11/2003 |
| WO | WO 2004/105208 | 12/2004 |
| WO | WO 2006/049606 | 5/2006 |
| WO | WO 2010/005324 | 1/2010 |

* cited by examiner

INDUCTIVELY COUPLED POWER RECEIVER AND METHOD OF OPERATION

This application is a National Stage Application of PCT/NZ2009/000137, filed 7 Jul. 2009, which claims benefit of Ser No. 569615, filed 7 Jul. 2008 in New Zealand and which applications are incorporated herein by reference. To the extent appropriate, a claim of priority is made to each of the above disclosed applications.

FIELD OF THE INVENTION

The present invention is in the technical field of Inductively Coupled Power Transfer systems (ICPT). More particularly the present invention relates to a contactless power receiver including a semiconductor operating in linear mode.

BACKGROUND OF THE INVENTION

Contactless power systems comprise of a contactless power transmitter that includes a conductive path supplied with alternating current from a power supply and one or more contactless power receivers. These contactless power receivers are within proximity, but electrically isolated from, the conductive path. A contactless power receiver includes a pick up coil in which a voltage is induced by the magnetic field generated by the conductive path, and supplies an electric load. The pick up coil is usually tuned using a tuning capacitor to increase power transfer capacity of the system.

One of the issues with contactless power receivers is their low efficiency when they are lightly loaded, for example when a motor powered by a power receiver is idle while it awaits a command from a control system. This can be overcome by implementing power flow control via a power controller between the pick-up coil and the load.

One implementation of a power controller uses a shorting switch as part of the pick-up circuit to decouple the pick-up coil from the load as required. This approach is described in the specification of U.S. Pat. No. 5,293,308 assigned to Auckland UniServices Limited and is referred to as "shorting control".

Although the technology addresses the power flow control problem from the pickup to the load, the shorting switch can cause large conduction losses, especially at light loads because the pickup circuit is nearly always shorted under no load or light load conditions.

Another problem with contactless power systems is frequency variations due to changes in load conditions and other circuit parameters. This can cause changes in the pick-up coil in terms of the induced voltage magnitude and short circuit current, which affect the power transfer capacity of the system. This is particularly a problem in fixed or passively tuned contactless power receivers.

One approach described in US patent specification US2007/109708A1 & U.S. Pat. No. 7,382,636B2 is to dynamically tune or de-tune the power pick-up by varying the effective capacitance or inductance of the power receiver. This enables the contactless power receiver to compensate for frequency drifts caused by parameter changes. The effective capacitance or inductance is varied by employing two semiconductor switches in series with the capacitor or inductor. Also a means of sensing pick-up coil current magnitude and phase is required to enable soft switching of the variable capacitor or resistor. By implementing dynamic tuning not only can frequency drifts be compensated for but much higher quality factors (Q>10) can be realized than in passively tuned systems (normally Q<6) as the pick-up coil resonant frequency can be fine tuned. Higher quality factor increases the power transfer capacity of the systems.

In order to miniaturize the contactless power pickup circuitry it is beneficial to eliminate the pick-up coil sensor which is particularly complicated at high frequencies. Removal of this eliminates the ability to soft switch the variable capacitor or inductor i.e. the system is now hard switched. This implementation causes excessively high currents or voltages because either the inductor current can be switched off or the capacitor can be shorted during the switching process. The resulting switching transients contribute to EMI, stresses of tuning semiconductor switches, and reduces the system power efficiency due to excessive power losses. In the worst cases it can cause system failure.

It is an object of the present invention to provide a method for controlling, or apparatus for contactless power receivers which will ameliorate one or more of the disadvantages suffered by existing systems, or which will at least provide the public with a useful alternative.

SUMMARY OF THE INVENTION

According to one exemplary embodiment there is provided a contactless power receiver suitable for use in a near field inductively coupled power transfer system including:
a. a pick up coil;
b. one or more semiconductor devices for controlling current flow through the pick up coil; and
c. a control circuit which drives at least one semiconductor device in linear mode over at least part of its range of operation to tune the power receiver based on the output of the contactless power receiver.

According to a further exemplary embodiment there is provided a system for use with electronic devices including
a. a power transmitter including a drive circuit energizing a coil generating a magnetic field; and
b. a power receiver as hereinbefore described wherein the power receiver is connected to an electronic device either through an energy storage device or directly.

According to another exemplary embodiment there is provided in a contactless power system in which a. power transmitter transmits power via a magnetic field to a pick up coil of a power receiver, a method of tuning the power receiver over at least part of its range of operation by varying the resistance applied across the pick-up coil of the power receiver.

According to another exemplary embodiment there is provided a contactless power receiver suitable for use in a near field inductively coupled power transfer system including:
a. pick up coil inputs;
b. one or more semiconductor devices connected to the pick up coil inputs; and
c. a control circuit which when in use with a pick up coil connected to the pick up coil inputs drives at least one semiconductor device in linear mode over at least part of its range of operation to tune the power receiver based on the output of the contactless power receiver.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
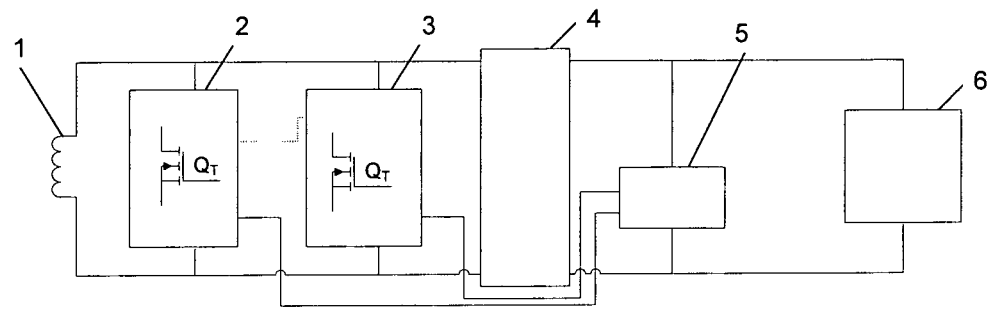
FIG. 1 shows a block diagram of a contactless power receiver.

FIG. 1 shows a contactless power receiver that includes a pick up coil 1 that is connected to one or more semiconductor devices 2, 3. These semiconductor devices 2, 3 are driven by a control circuit 5 that modulates the semiconductor devices 2, 3. The design also includes a full or half bridge rectifier circuit 4 to provide a DC supply for the control circuit 5 and the electronic or energy storage device 6.

When in proximity of a magnetic field an electromotive force is induced in pick up coil 1. As the magnetic coupling between the magnetic field and pick up coil 1 is very loose compared to traditional transformers, the induced voltage is usually unsuitable for direct use.

A power controller is necessary to regulate the power depending on the power requirements of the electronic or energy storage device 6. The pick up coil 1 also needs to be tuned in order to increase the power transfer capacity of the system. A dynamic tuning method can be used to regulate the power and enable tuning of pick up coil 1 to increases or decrease the power transfer capacity of the system. This compensation method also allows the contactless power receiver to track variations in system frequency.

We have found that dynamically tuning a contactless power receiver that modulates semiconductor devices 2,3 in ohmic linear mode offers performance advantages over switch mode switching.

Active switch mode based tuning requires the system to be soft switched which requires a current sensor to detect the pick up coil 1 phase and magnitude. These sensors are large devices and often require unique signal processing circuitry.

If active switch mode based tuning is used without this sensor the device is said to be hard switched and the capacitive or inductive tuning element is effectively shorted when the respective semiconductor device is ON. This causes switching transients which contribute to EMI and stress the capacitive or inductive tuning element and the semiconductor device itself, affecting overall systems efficiency and reliability.

A semiconductor device may operate in either ohmic (linear) and active (saturation full conduction) regions when ON. If a semiconductor device cycles between OFF and ON-ohmic region it is said to be operating in linear mode. If it cycles between OFF and ON-active region it is said to be operating in switch mode.

Operating the semiconductor devices in linear mode overcomes these issues as the device acts as a resistive element with the capacitive or inductive tuning element. For example in the case of the semiconductor device being a MOSFET this is implemented by controlling the gate drive voltage to be in the ohmic region of the MOSFET.

Figure 2:
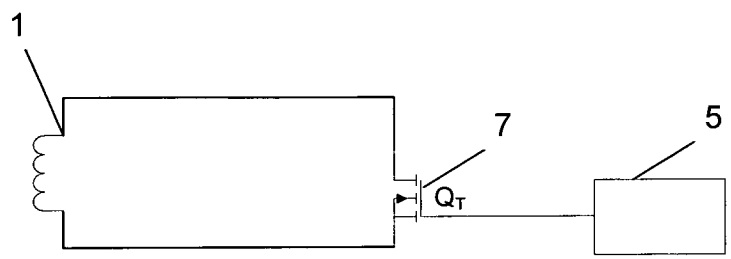
FIG. 2 shows one implementation of a resistively tuned contactless power receiver that includes one semiconductor device driven by a control circuit and connected to a Pick up coil.

FIGS. 2 to 5 are abbreviated forms of FIG. 1 only showing key elements. FIG. 2 shows resistive tuning that includes a semiconductor device 7 by itself driven in linear mode. The advantage of this method is that it allows fine tuning without requiring reactive components which increase the form factor of the system.

Figure 3:
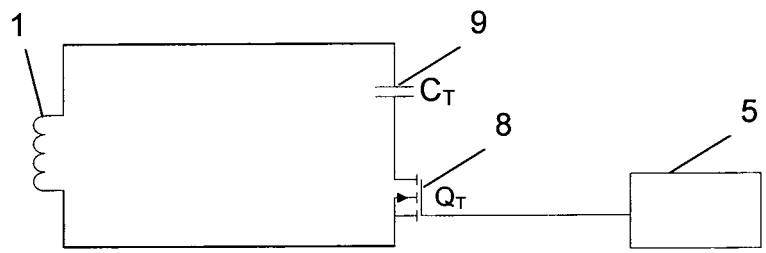
FIG. 3 shows one implementation of a capacitive tuned contactless power receiver that includes one semiconductor device driven by a control circuit and connected to a Pick up coil.

FIG. 3 shows capacitive tuning that includes a semiconductor device 8 in series with a capacitor 9 as shown. The advantage of this method is that it provides a large power transfer capacity tuning range.

Figure 4:
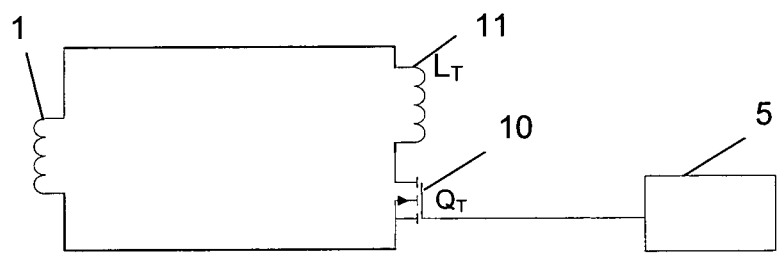
FIG. 4 shows one implementation of an inductively tuned contactless power receiver that includes one semiconductor device driven by a control circuit and connected to a Pick up coil.

FIG. 4 shows an inductive tuning that includes a semiconductor device 10 in series with an inductor 11. The advantage of this method is that it provides better tuning resolution for the system and therefore more accurate control of the power transfer capacity.

Figure 5:
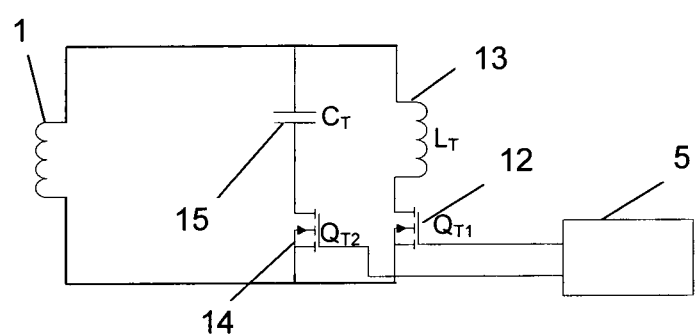
FIG. 5 shows one implementation of hybrid tuned contactless power receiver including a semiconductor device connected to a capacitor and another semiconductor device connected to an inductor connected in parallel with a Pick up coil and being driven by a control circuit.

FIG. 5 shows hybrid tuning including a semiconductor devices 12, 14 in series with inductor(s) 13 and capacitor(s) 15. This implementation has the advantages of capacitive and inductive tuning. A plurality of the above apparatus may be used in parallel depending on the requirements of the contactless power receiver.

Semiconductor devices are switched by a control circuit 5 based on the output of the contactless power receiver. The control circuit may use simple analog devices such as comparator or operational amplifiers to implement control strategies or advanced digital devices such as microcontrollers that include look up tables or gate array logic devices may be used.

Methods for operating the semiconductor devices 2, 3 in linear mode to vary the effective resistance across the pick up coil 1 include modulating the semiconductor devices 2, 3 in linear mode only or in linear and mode as required. In contactless power receivers that include a plurality of semiconductor devices 2, 3 some may be operated in linear mode for fine tuning and others in mode for coarse tuning. Depending on the required tuning one semiconductor device may be switched into full conduction and another device may be used to implement fine tuning through linear mode operation.

Control strategies used to implement linear mode tuning include Schmitt triggers, proportional, integral and differential controllers.

Figure 6:
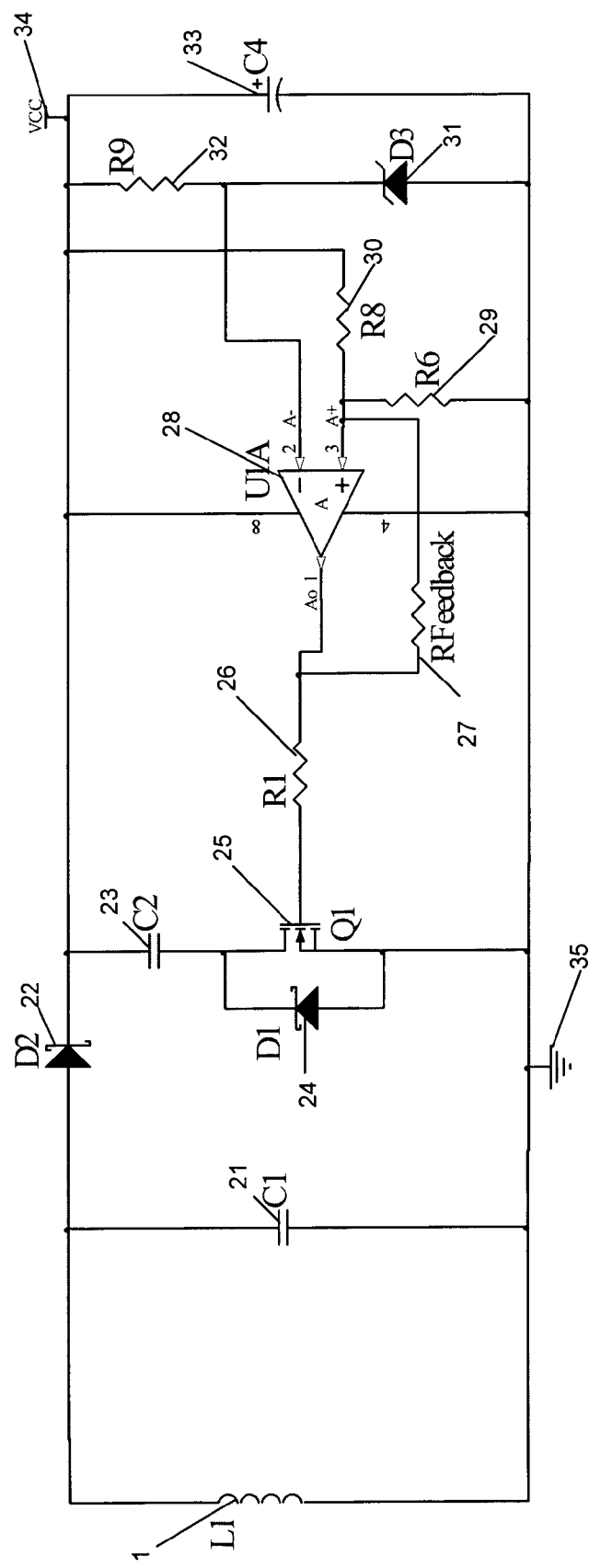
FIG. 6 shows a detailed implementation of capacitive tuning using one semiconductor device connected to a Pick up coil and being driven by a control circuit including an operational amplifier.

An example of a system that uses capacitive tuning is shown in FIG. 6. In this embodiment capacitor 23 is switched using semiconductor device 25 to tune pick up coil 1. This semiconductor device has an external diode 24 in addition to its body diode to reduce conduction losses through this semiconductor device 24. A capacitor 21 is placed in parallel with the pick up coil to adjust the tuning range of the contactless power receiver. A diode 22 is used to implement a half bridge rectifier in this design.

The control circuit apparatus used to control semiconductor device 25 consists of an operational amplifier 28 that uses feedback from terminal 34. The operational amplifier compares the voltage at terminal 34 against a reference voltage that is implemented using Zener diode 31. Resistors 29, 30 are used to implement a voltage divider to ensure that the input voltage into operational amplifier 28 is bellow it's maximum level and corresponds to the reference voltage applied by Zener 31.

Figure 7:
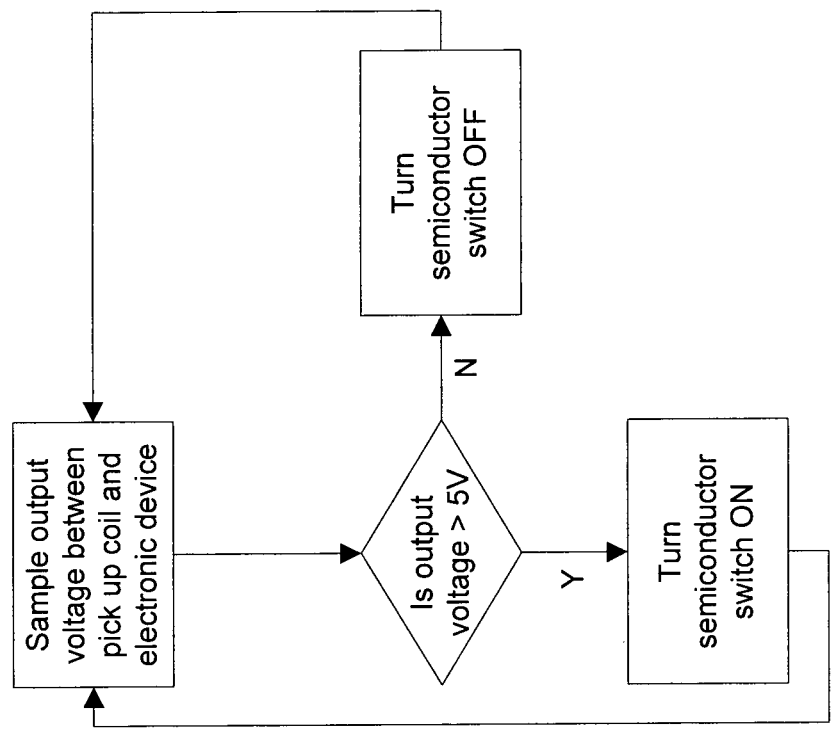
FIG. 7 shows a simple algorithm used to implement a control strategy for a semiconductor device that is being used to implement tuning.

This control circuit effectively implements a Schmitt trigger control strategy as shown in FIG. 7. The operational amplifier is configured using resistors 27, 26 to ensure that the gate drive voltage for semiconductor switch 25 is controlled to modulate it in linear mode.

Following are the component values corresponding to reference designators in FIG. 6:

| Designator | Value |
|---|---|
| C1 | 1.36 uF |
| C2 | 1.5 uF |
| C4 | 1 uF |
| D1 | BAT54 |
| D2 | BAT54 |
| D3 | 2.4 V |
| L1 | 4.4 uH |
| Q1 | BCY-W3/B.8 |
| R1 | 150R |
| R6 | 5k6 |
| R8 | 10k |
| R9 | 2K |
| RFeedback | 50K |
| U1 | LT1464ACS8 |

This contactless power receiver may be integrated within an energy storage device (e.g. a battery or a capacitor) or electronic device (such as a rechargeable consumer device) to enable a system to receive wireless power. Semiconductor devices 2, 3 and control circuit 5 may be integrated onto an integrated circuit (IC) and the pick up coil 1 and other components connected as peripherals to the terminals of this IC.

This contactless power receiver may be placed in the vicinity of a planar magnetic field which induces an electromotive force in the pick up coil 1 and allows the contactless power receiver to supply power to a device. The planar magnetic field can be generated by a wireless charging pad.

This apparatus and methodology allows the contactless power receiver to implement power flow control and operate in an efficient manner at low loads as the power transfer capacity of the system is adjusted based on the device's power requirements. The contactless power receiver is also able to adjust for frequency variations in the system as it is able to dynamically tune itself.

This system is also able to achieve higher Q with a lower component count, form factor and design complexity as it does not require an additional bulky pick up coil sensor to soft switch the system and associate control circuitry.

This contactless power receiver enables results in better power to volume, efficiency and range performance metrics.

While the present invention has been illustrated by the description of the embodiments thereof, and while the embodiments have been described in detail, it is not intended to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the general inventive concept.

The invention claimed is:

1. A contactless power receiver suitable for use in a near field inductively coupled power transfer system including:
    a. a pick up coil;
    b. a metal-oxide-semiconductor filed-effect transistor (MOSFET) for controlling current flow through the pick up coil; and
    c. a control circuit which drives the MOSFET in linear mode over at least part of its range of operation to tune the pick up coil based on a voltage output of the contactless power receiver, the control circuit comprising:
        an operational amplifier operatively connected to a gate of the MOSFET, the operational amplifier comparing the voltage output of the contactless power receiver to a reference voltage; and
        a resistive feedback arrangement for establishing dynamic gain of the operational amplifier;
        wherein driving the MOSFET in linear mode comprises configuring the operational amplifier by the dynamic gain established by the resistive feedback arrangement to drive the MOSFET to switch between OFF and ON-ohmic region by controlling a gate drive voltage of the MOSFET to be in the ohmic region of the MOSFET.

2. The power receiver as claimed in claim 1 wherein the control circuit drives the MOSFET to achieve essentially pure resistive tuning of the power receiver.

3. The power receiver as claimed in claim 1 wherein the control circuit drives the MOSFET in association with a capacitor resulting in capacitive tuning of the power receiver.

4. The power receiver as claimed in claim 1 wherein the control circuit drives the MOSFET in association with an inductor resulting in inductive tuning of the power receiver.

5. The power receiver as claimed in claim 1 wherein the control circuit drives the MOSFET in association with a capacitor and inductor resulting in hybrid tuning of the power receiver.

6. The power receiver as claimed in claim 1 wherein at least one other semiconductor device in addition to the MOSFET is used in parallel to tune the pick up coil.

7. The power receiver as claimed in claim 1 wherein the control circuit further includes at least one of a comparator, a microcontroller, a microcontroller with a look up table and a gate array logic device.

8. The power receiver as claimed in claim 1 wherein the power receiver is integrated with an energy storage device.

9. The power receiver of claim 1 wherein the power receiver is incorporated into an electronic device.

10. The power receiver as claimed in claim 1 wherein the MOSFET and control circuit are incorporated into an integrated circuit.

11. In a contactless power system suitable for use in a near field inductively coupled power transfer system in which a power transmitter transmits power via a magnetic field to a pick up coil of a power receiver, a method of tuning the pick up coil over at least part of the range of operation of the power receiver by:
    using a control circuit to drive metal-oxide-semiconductor filed-effect transistor (MOSFET) of the power receiver in linear mode to vary the resistance applied across the pick-up coil based on a voltage output of the contactless power receivers;
        wherein the control circuit comprises an operational amplifier operatively connected to a gate of the MOSFET, the operational amplifier comparing the voltage output of the contactless power receiver to a reference voltage; and a resistive feedback arrangement for establishing dynamic gain of the operational amplifier;
    and wherein driving the MOSFET in linear mode comprises configuring the operational amplifier by the dynamic gain established by the resistive feedback arrangement to drive the MOSFET to switch between OFF and ON-ohmic region by controlling a gate drive voltage of the MOSFET to be in the ohmic region of the MOSFET.

12. A method as claimed in claim 11 wherein at least one other semiconductor device in addition to the MOSFET is operated in linear mode to vary the resistance applied across the pick up coil.

13. A method as claimed in claim 11 wherein at least one other semiconductor device and the MOSFET are provided in parallel with the pick up coil and the other semiconductor device modulated in linear mode for fine tuning.

14. A method as claimed in claim 13 wherein the other semiconductor device operates in switch mode.

15. A method as claimed in claim 13 wherein the other semiconductor device operates in full conduction mode.

16. The method as claimed in claim 11 wherein control strategies used to tune the power receiver include one of a Schmitt trigger, proportional control, integral control and differential control.

17. A system for use with electronic devices including
   a. a power transmitter including a drive circuit energizing a coil generating a magnetic field; and
   b. a power receiver as claimed in claim 1 wherein the power receiver is connected to an electronic device either through an energy storage device or directly.

18. The system as claimed in claim 17 wherein the electronic device is a consumer electronic device.

19. The system as claimed in claim 17 wherein the contactless power receiver is placed in a planar magnetic field generated by a charging pad.

20. A contactless power receiver suitable for use in a near field inductively coupled power transfer system including:
   a. pick up coil inputs;
   b. a metal-oxide-semiconductor filed-effect transistor (MOSFET) connected to the pick up coil inputs; and
   c. a control circuit which when in use with a pick up coil connected to the pick up coil inputs drives at the MOSFET in linear mode over at least part of its range of operation to tune the pick up coil at the pick up coil inputs based on a voltage output of the contactless power receiver, the control circuit comprising:
      an operational amplifier operatively connected to a gate of the MOSFET, the operational amplifier comparing the voltage output of the contactless power receiver to a reference voltage; and
      a resistive feedback arrangement for establishing dynamic gain of the operational amplifier;
   wherein driving the MOSFET in linear mode comprises configuring the operational amplifier by the dynamic gain established by the resistive feedback arrangement to drive the MOSFET to switch between OFF and ON-ohmic region by controlling a gate drive voltage of the MOSFET to be in the ohmic region of the MOSFET.

* * * * *